(12) United States Patent
Worden et al.

(10) Patent No.: US 11,723,312 B2
(45) Date of Patent: Aug. 15, 2023

(54) COMPRESSION SPRING ASSEMBLY

(71) Applicant: Rowse Hydraulic Rakes Co., Inc., Burwell, NE (US)

(72) Inventors: Randy L. Worden, Burwell, NE (US); Rodney D. Rowse, O'Neill, NE (US)

( * ) Notice: Subject to any disclaimer, the term of this patent is extended or adjusted under 35 U.S.C. 154(b) by 410 days.

(21) Appl. No.: 16/887,604

(22) Filed: May 29, 2020

(65) Prior Publication Data
US 2021/0144925 A1    May 20, 2021

Related U.S. Application Data

(60) Provisional application No. 62/937,454, filed on Nov. 19, 2019.

(51) Int. Cl.
| | |
|---|---|
| *A01D 80/00* | (2006.01) |
| *A01D 78/14* | (2006.01) |
| *F16F 1/06* | (2006.01) |
| *F16M 13/02* | (2006.01) |
| *F16F 1/12* | (2006.01) |

(52) U.S. Cl.
CPC ........... *A01D 80/00* (2013.01); *A01D 78/146* (2013.01); *F16F 1/06* (2013.01); *F16F 1/128* (2013.01); *F16M 13/02* (2013.01); *F16M 2200/048* (2013.01)

(58) Field of Classification Search
CPC ......... A01D 80/00; A01D 78/146; F16F 1/06; F16F 1/128; F16F 13/02; F16F 2200/048
USPC .......... 56/377, 375, 376, 3, 14.7, 14.9, 15.9, 56/16.1, 180, 394; 248/288.11, 291.1, 248/292.11
See application file for complete search history.

(56) References Cited

U.S. PATENT DOCUMENTS

| | | | | |
|---|---|---|---|---|
| 2,560,726 A | * | 7/1951 | Jones ..................... | A01D 80/00 172/383 |
| 2,647,353 A | * | 8/1953 | Dort ..................... | A01D 45/028 56/103 |
| 2,827,754 A | * | 3/1958 | Hill ......................... | A01D 78/16 56/377 |
| 3,110,149 A | * | 11/1963 | Robins ................. | A01D 78/146 56/377 |
| 3,173,307 A | * | 3/1965 | Breed ..................... | F16D 23/12 74/535 |
| 4,657,230 A | * | 4/1987 | Weseloh ................. | F16D 65/56 213/40 R |
| 4,932,197 A | * | 6/1990 | Allen ..................... | A01D 78/146 56/228 |
| 5,301,496 A | * | 4/1994 | Sudbrack ............... | A01D 57/20 56/366 |
| 5,305,590 A | * | 4/1994 | Peeters ................ | A01D 78/144 56/228 |
| 5,381,648 A | * | 1/1995 | Seegert ................. | A01D 34/74 56/15.9 |
| 5,826,846 A | * | 10/1998 | Buccieri ............ | F16M 11/2014 248/278.1 |

(Continued)

*Primary Examiner* — Christopher Garft
*Assistant Examiner* — Michael McDuffie
(74) *Attorney, Agent, or Firm* — Zarley Law Firm, P.L.C.

(57) ABSTRACT

The present invention relates to a compression spring assembly for a hay rake. The compression spring assembly has a rod that slidably receives a first stop, a compression spring, and a second stop. A limiter assembly is connected to the rod and has a limiting member that is received through a guide of a guide assembly that is connected to the rod. The guide encompasses the limiting member.

18 Claims, 4 Drawing Sheets

(56) References Cited

U.S. PATENT DOCUMENTS

| | | | | |
|---|---|---|---|---|
| 6,220,008 B1* | 4/2001 | Rowse | ............... | A01D 78/08 |
| | | | | 56/375 |
| 6,405,517 B1* | 6/2002 | Peeters | ............. | A01D 78/144 |
| | | | | 172/311 |
| 6,834,488 B2* | 12/2004 | Menichetti | .......... | A01D 78/146 |
| | | | | 56/378 |
| 6,880,317 B2* | 4/2005 | Schlesser | ............. | A01B 63/32 |
| | | | | 56/11.9 |
| 7,234,664 B1* | 6/2007 | Anderson | ............ | F16F 1/128 |
| | | | | 244/50 |
| 7,322,568 B2* | 1/2008 | Peeters | ............... | A01D 78/14 |
| | | | | 267/72 |
| 7,360,353 B2* | 4/2008 | Hruska | ............. | A01D 78/146 |
| | | | | 56/377 |
| 2014/0196429 A1* | 7/2014 | Gantzer | .............. | A01D 84/00 |
| | | | | 56/377 |
| 2014/0237972 A1* | 8/2014 | Collins | .............. | A01D 78/142 |
| | | | | 56/16.7 |
| 2021/0137012 A1* | 5/2021 | Mortaro | ............. | A01D 78/04 |

\* cited by examiner

COMPRESSION SPRING ASSEMBLY

CROSS REFERENCE TO RELATED APPLICATION

This application claims the benefit and priority of U.S. Ser. No. 62/937,454 filed Nov. 19, 2019, the contents of this application is hereby incorporated by reference in their entirety.

BACKGROUND OF THE INVENTION

This invention is directed towards a compression spring assembly. More specifically, and without limitation, this invention relates to a compression spring assembly for a hay rake.

Hay rakes are are well known in the art as an agricultural implement used to collect or fluff hay, straw, and other agricultural vegetation. A hay rake has a plurality of hay rake wheels that are commonly arranged in a V-shape with the hay rake wheels closest to the tractor pulling the hay rake being set furthest apart and each subsequent pair of hay rake wheels positioned closer together. The hay rake wheels are positioned at an angle with respect to the tractor so that as agricultural vegetation is raked it is funneled closer and closer together by the each set of corresponding hake rakes until it is gathered in a row substantially narrower than the width of the hay rake. Thereafter, the raked agricultural vegetation can be gathered in a variety of ways, including baling.

During operation, the hay rake carries significant weight with each hay rake wheel having a substantial weight and the raked agricultural vegetation adding even more weight during operation. As the weight held by the hay rake and the hay rake wheel increase, the distance between the hay rake wheel and the ground surface is decreased until the hay rake wheel engages the ground and is "ground driven". Having a hay rake wheel be ground driven is not always desirable as it can cause damage to the hay rake or reduce the speed at which raking can occur. As a result, hay rake wheels are connected to a hay rake with a compression spring assembly that can limit the distance by which a hay rake wheel can be lowered.

One advancement in this field is a compression spring assembly that uses a slatted plate that is received in a U-shaped bracket. Although beneficial, problems remain. To begin, the slatted shape lacks rigidity and can easily be bent or otherwise warped when too much pressure is applied or an unexpected amount of force is applied to the slatted plate. Further, the U-shaped bracket fails to restrict the slatted plate along a vertical axis, which increases the wear on the hay rake and the likelihood of the slatted plate bending or warping. The failure of the compression spring assemblies known in the art can lead to the alignment of the hay rake being off due to the failure of a single compression spring assembly. Still further, current embodiments in the art of a compression spring assembly require a multiple component pin latch to restrict the movement of the slatted plate along a horizontal axis.

Thus it is a primary objective of this invention to provide a compression spring assembly that improves upon the art.

Another objective of this invention is to provide a compression spring assembly that has increased rigidity.

Yet another objective of this invention is to provide a compression spring assembly that requires fewer parts.

Another objective of this invention is to provide a compression spring assembly that is less expense to fabricate and assemble.

Yet another objective of this invention is to provide a compression spring assembly that provides smoother operation.

Another objective of this invention is to provide a compression spring assembly that reduces wear.

These and other objectives, features, and advantages of the invention will become apparent from the specification and claims.

SUMMARY OF THE INVENTION

In general, the present invention relates to a compression spring assembly for a hay rake. The compression spring assembly includes a rod that slidably receives a stop assembly, a boxing assembly, and a compression spring assembly, which is positioned between the stop assembly and the boxing assembly. The stop assembly and the boxing assembly have stops that operate to compress the compression spring during operation of the hay rake as agricultural vegetation is engaged by a hay rake wheel.

To limit the distance the compression spring can compress, a limiter assembly is connected to the boxing assembly. The limiter assembly has a limiting member that extends through and is encompassed by a guide of a guide assembly connected to the rod. A plurality of holes receive a pin to restrict the limiting member from passing through the guide past where the pin is inserted in the limiting member.

At one end of the rod is an adjustment member that is configured to adjust the weight bore by the hay rake wheel. On the opposite end of the rod is an arm connection member that connects the compression spring assembly to an arm of the hay rake. A rake wheel assembly is connected to the boxing assembly, which connects the compression spring assembly to the hay rake wheel of the hay rake.

DETAILED DESCRIPTION

Figure 1:
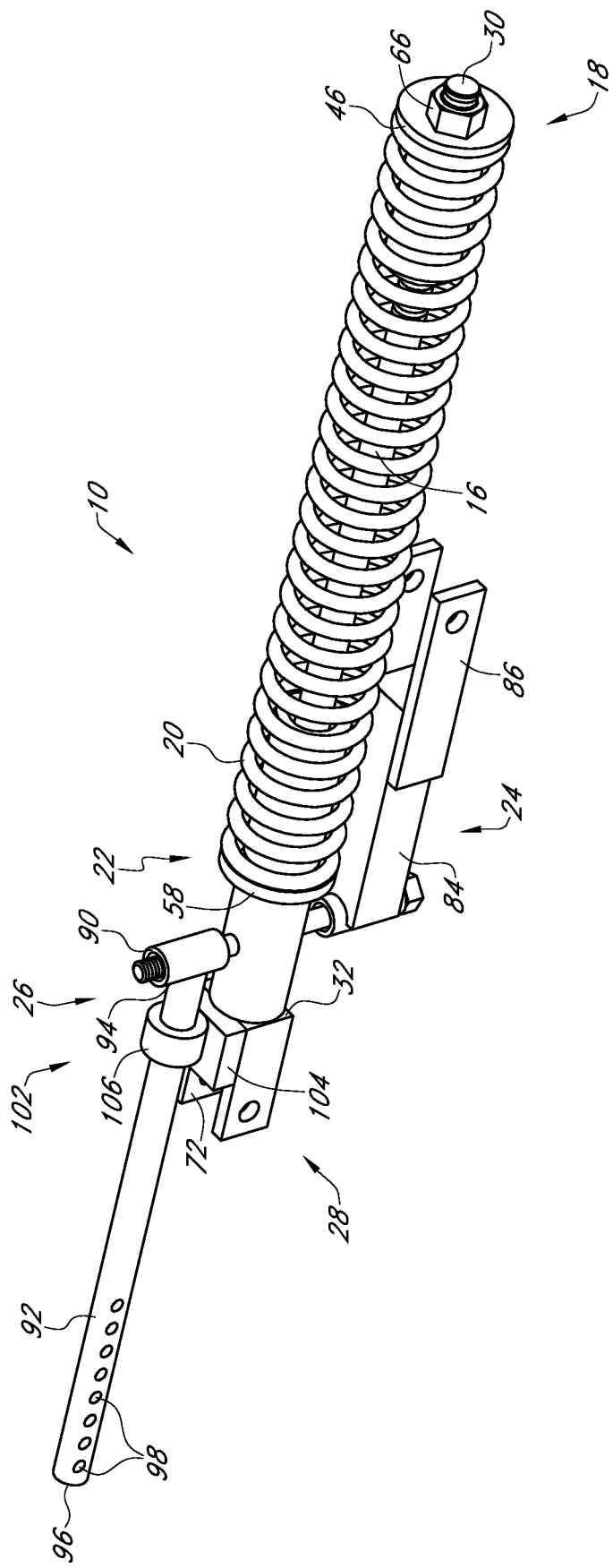
FIG. 1 is a perspective view of a compression spring assembly.
Figure 2:
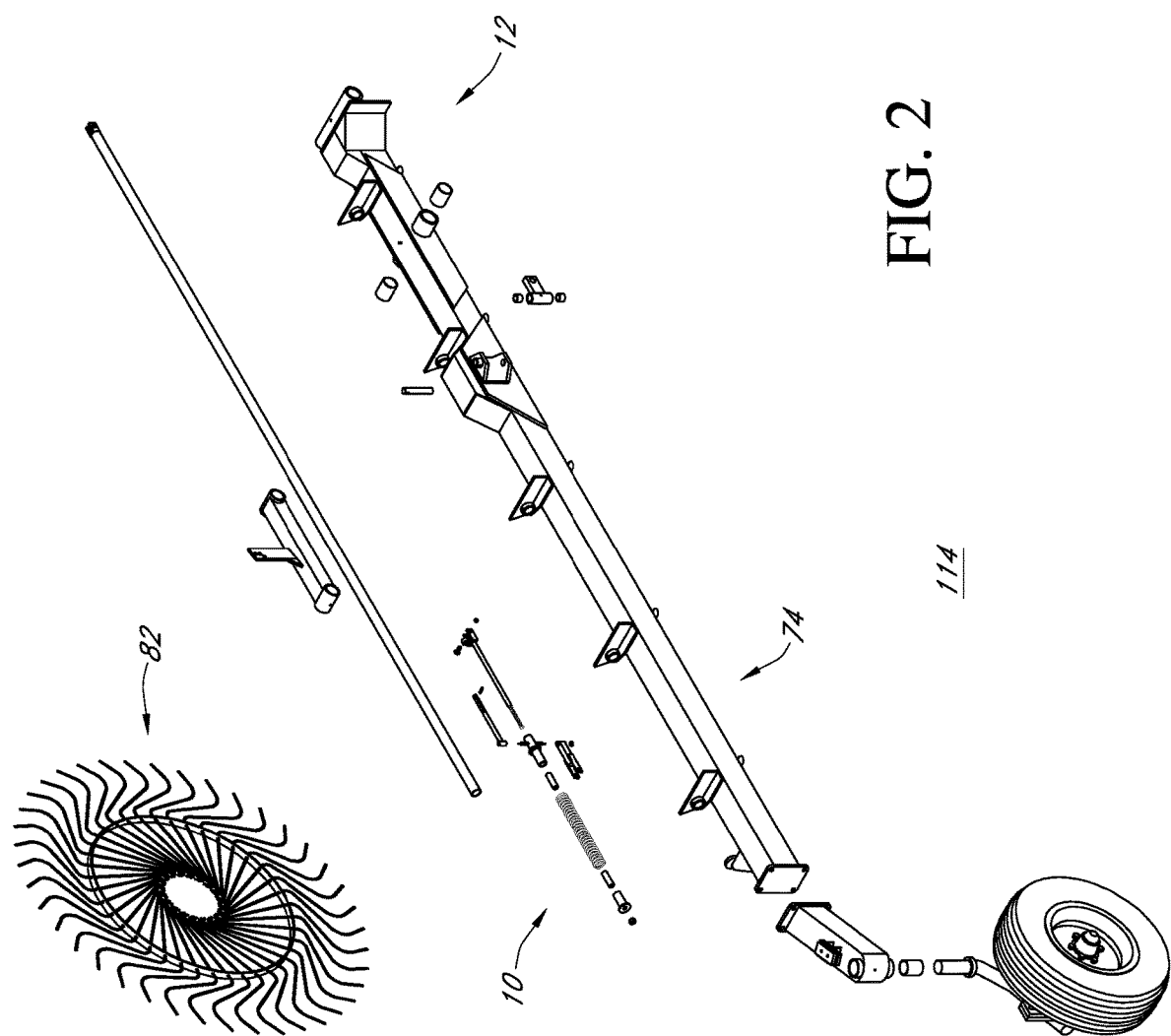
FIG. 2 is an exploded view of a compression spring assembly and a hay rake.
Figure 3:
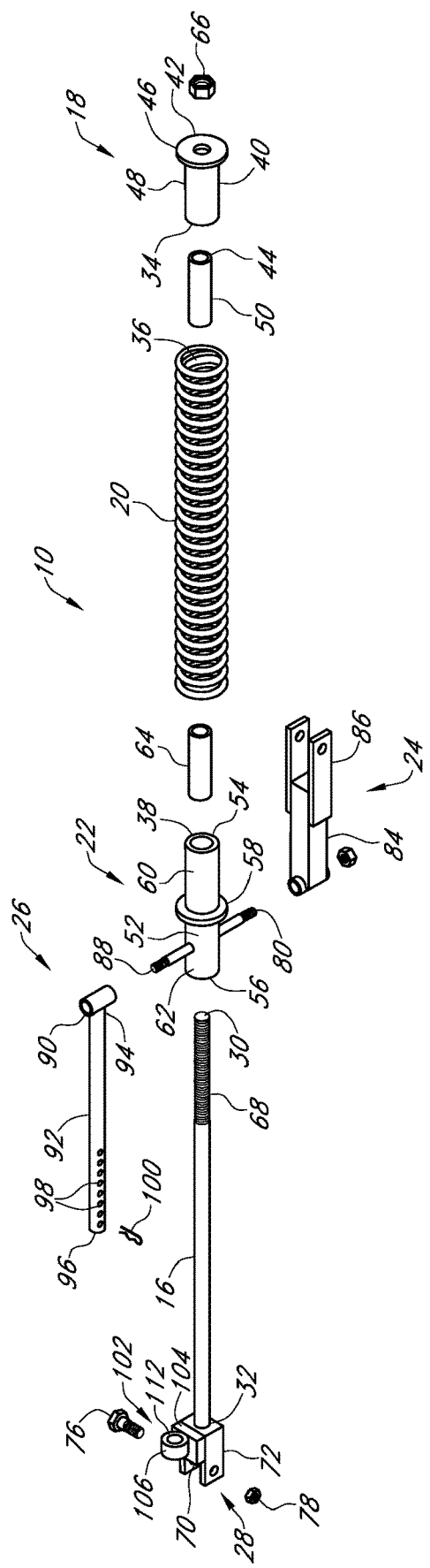
FIG. 3 is an exploded view of a compression spring assembly.
Figure 4:
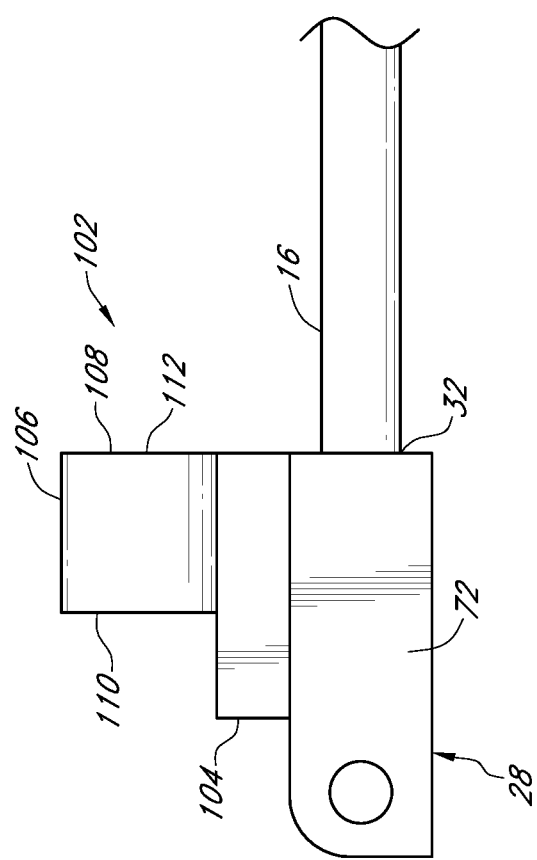
FIG. 4 is a side view of a compression spring assembly.

With reference to the figures, a compression spring assembly 10 for a hay rake 12 is shown. The hay rake 12 is configured to be attached to a tractor 14 (not shown) to collect or fluff cut hay, straw, or other agricultural vegetation.

The compression assembly 10 has a rod 16 that is received through a stop assembly 18, a spring or compression spring 20, and a boxing assembly 22. The compression spring assembly 10 has rake wheel connection assembly 24 and a limiter assembly 26 that are connected to the boxing assembly 22 and an arm connection assembly 28 that is connected to the rod 16.

The rod 16 extends from a first end 30 to a second end 32. In some embodiments, the first end 30 is threaded and the second end 32 is threaded, but in other arrangements only the first end 30 or the second end 32 is threaded, and in still others, the first end 30 and the second end 32 are not threaded.

In some arrangements of the present invention, the rod 16 is received through an opening or first opening 34 in the stop assembly 18, an opening or second opening 36 through the center of the compression spring 20, and an opening or third opening 38 in the boxing assembly 22. In this arrangement, the stop assembly 18 is adjacent the first end 30 of the rod 16 and the boxing assembly 22 is adjacent the second end 32 of the rod 16 with the compression spring 20 positioned between the stop assembly 18 and the boxing assembly 22.

The stop assembly 18 has a body or first body 40 that extends from a first end 42 to a second end 44. At the first end 42 of the stop assembly 18 is a stop or first stop 46. The first stop 36 has a diameter that is larger than a diameter of the compression spring 20 such that the compression spring 20 cannot pass the stop 46. In some embodiments, the body 40 of the stop assembly 18, except for the first stop 46, has a diameter that is smaller than the opening 36 of the compression spring 20 such that the compression spring 20 can be received over a portion 48 of the body 40 of the stop assembly 18. In some embodiments, a bushing or first bushing 50 is received within the opening 34 of the stop assembly 18 to reduce vibration between the rod 16 and the stop assembly 18.

The boxing assembly 22 has a body or second body 52 that extends from a first end 54 to a second end 56. Between the first end 54 and the second end 56 is a stop or second stop 58. The second stop 36 has a diameter that is larger than a diameter of the compression spring 20 such that the compression spring 20 cannot pass the stop 58. The position of the stop 58 separates the body 52 of the boxing assembly 22 into a first portion 60 extending between the stop 58 and the first end 54 and a second portion 62 extending between the stop 58 and the second end 56. The first portion 60 has a diameter that is smaller than the opening 36 of the compression spring 20 such that the compression spring 20 can be received over the first portion 60 of the boxing assembly 22. In some embodiments, the second portion 62 has the same diameter as the first portion 60. In some embodiments, a bushing or second bushing 64 is received within the opening 38 of the boxing assembly 22 to reduce vibration between the rod 16 and the boxing assembly 22. The position of the compression spring 20 between the first stop 46 of the stop assembly 18 and the second stop 58 of the boxing assembly 22 restrict the compression spring 20 from expanding beyond the first stop 46 and the second stop 58.

Adjacent and connected to the first end 30 of the rod 16 is an adjustment member 66, which in some arrangements is a nut that is threadably received over a first threaded portion or threaded portion 68 of the rod 16. The adjustment member 66 is positioned between the first end 30 of the rod 16 and the first end 42 of the stop assembly 42. The adjustment member 66 has a diameter that is larger than the opening 34 in the stop assembly 18 thereby preventing the stop assembly 18 from passing past the adjustment member 66 towards the first end 30 of the rod 16. In some arrangements, the adjustment member 66 abuts the stop assembly 18.

Adjacent and connected to the second end 32 of the rod 16 is the arm connection assembly 28, which is some arrangements is welded to the rod 16 or threadably connected to a second threaded portion or threaded portion 70 of the rod 16. The arm connection assembly 28 is larger than a diameter of the opening 38 in the boxing assembly 22 thereby preventing the boxing assembly 22 from passing past the arm connection assembly 28 towards the second end 32 of the rod 16. In some embodiments, the arm connection assembly 28 abuts the boxing assembly 22.

In some embodiments of the present invention, the stop assembly 18 is slidably received over the rod 16 such that the stop assembly 18 can compress the compression spring 20 in a direction towards the second end 32 of the rod 16 but is restricted from sliding past the adjustment member 64. Likewise, the boxing assembly 22 is slidably received over the rod such that the boxing assembly 22 can compress the compression spring 20 in a direction towards the first end 30 of the rod 16 but is restricted from sliding beyond the arm connection assembly 28. The adjustment member 66 is configured to adjust a distance between the first stop 46 and the second stop 58, which in turn reduces a weight bore on the hay rake wheel 82 during operation. For instance, when the adjustment member 66 is a nut, the nut 66 is fastened further away from the first end 30 of the rod 16 thereby reducing the distance between the stop assembly 34 and the arm connection assembly 28.

The arm connection assembly 28, in some embodiments of the present invention, has a clevis or first clevis 72 that is generally U-shaped in some arrangements. The clevis 72 extends outwardly from the second end 32 of the rod 16 in a direction opposite of the first end 30 of the rod 16. The clevis 72, in some embodiments, extends in parallel alignment with an axis extending a length of the rod 16 between the first end 30 and second end 32. The clevis 72 is configured to connect to an arm 74 of the hay rake 12. In some arrangements, the clevis 72 receives a pin or bolt 76 that receives a clevis pin or nut 78 to secure the connection between the clevis 72 and the arm 74.

Extending from the boxing assembly 22 is a post or first post 80. In the exemplary embodiment, the post 80 extends outwardly and perpendicularly in relation to the second portion 62 of the boxing assembly 22. Connected to the post 80 is the rake wheel connection assembly 24. The rake wheel connection assembly 24 connects to a hay rake wheel 82. In an exemplary embodiment, the rake wheel connection assembly 24 has an extending member 84 that connects to the post 80 and extends from the post 80 towards the first end 30 of the rod 16. Connected to the extending member 84 is a clevis or second clevis 86. The clevis 86 is configured to connect to the hay rake wheel 82. In some arrangements, the clevis 86 receives a pin or bolt 88 that receives a clevis pin or nut 90 to secure the connection between the clevis 86 and the hay rake wheel 82. In some arrangements, the rake wheel connection assembly 24 extends outwardly away from the rod 16 and towards the first end 30 of the rod 16 such that the extending member 84 is closer to the rod 16 adjacent the post 80 than the clevis 86 is to the rod 16. In this configuration, the additional clearance between the compression spring 20 and the arm connection assembly 28 is provided.

Also extending from the boxing assembly 22 is a post or second post 88. In some embodiments, the post 88 extends outwardly and perpendicularly in relation to the second portion 62 of the boxing assembly 22. Connected to the post 88 is the limiter assembly 26. The limiter assembly 26 has a connecting member 90 that connects the limiter assembly 26 to the post 88. Extending from the connecting member 90 is a limiting member 92, which is some embodiments is cylindrical in shape that provides for increased rigidity over planar shapes. The limiting member 92 extends from a first end 94 to a second end 96. The first end 94 of the limiting member 92 is connected to the connecting member 90 adjacent the second post 88. The limiting member 92 extends away from the second post 88 from the first end 94 to the second end 96. In this way, the limiting member 92 extends away from the first end 30 and the second end 32 of the rod 16. The limiting member 92, in some embodiments, extends in parallel spaced alignment with the rod 16. The limiting member 92 has an opening or a plurality of openings 98 that extend through the limiting member 92. The plurality of openings 98 are configured to receive a clevis pin 100. In some embodiments, the plurality of openings 98 are spaced apart from each other by 0.50 inches and in still other embodiments 0.25 inches to allow for increased tuning as described further herein.

Connected to the second end 32 of the rod 16, and, in some arrangements, to the rake arm connection assembly 28 is a guide assembly 102 of the limiter assembly 26. The guide assembly 102, in some arrangements, has a mount plate 104 and a guide 106. The guide 106 of the present invention extends from a first end 108 to a second end 110, with the first end 108 being closer to the second end 32 of the rod 16 than the second end 110 of the guide 106. The guide 106 is tubular with an opening 112 that extends from the first end 108 to the second end 110 and is sized and shaped to receive the limiting member 92 though the opening 112. The mount plate 104, in some arrangements, is positioned between the guide 106 and the rod 16 or the arm connection assembly 28 such that the opening 112 of the guide 106 aligns with the limiting member 92. The opening 112 of the guide 106 extends in parallel or substantially parallel spaced alignment with the rod 16, which facilitates compression of the compression spring 20 as further described herein.

The limiting member 92 is slidably received through guide 106. The plurality of openings 98 extend perpendicularly or substantially perpendicularly to the opening 112 in the guide 106. The cylindrical shape of the guide 106 provides the unique benefit of preventing or restricting movement of the limiting member 92 due to the enclosure of the limiting member 92 within the guide 106. This in turn provides for smoother operation of the hay rake 12 and reduces wear on the compression spring assembly 10 and the hay rake 12. Further, the limiter assembly 26 of the present invention eliminates the presence of a pin latch, which is comprised of numerous components—this in turn reduces fabrication and assembly costs and reduces points of failure.

In operation, compression spring assembly 10 is connected to the arm 74 of the hay rake 12 by the arm connection assembly 28 and the hay rake wheel 82 by the rake wheel connection assembly 24. When the hay rake 12 is pulled, the hay rake wheel 82 engages agricultural vegetation. At this time, the hay rake wheel 82 is "crop driven", which means the hay rake wheel 82 is rotated or spun by engagement with the agricultural vegetation. As agricultural vegetation is raked, the downward force towards a ground surface 114 increases, which compresses the compression spring 20 as the boxing assembly 22 is slid towards the first end 30 of the rod 16 due to the connection between the boxing assembly 22 and the rake wheel connection assembly 24. This force will continue until the hay rake wheel 82 engages the ground surface 114, at which point the hay rake wheel 82 is "ground driven", which means the hay rake wheel 82 is rotated or spun by engagement with the ground surface 114.

The height that the hay rake wheel 82 is held above the ground surface 114 is adjusted with the limiter assembly 26. The clevis pin 100 is positioned through one of the plurality of openings 98 in the limiting member 92 between the second end 96 of the limiting member 92 and the second end 110 of the guide 106. As the hay rake wheel 82 is crop driven, the boxing assembly 22 begins to slide towards the first end of the rod 16 thereby compressing the compression spring 20 between the stop assembly 18 and the boxing assembly 22. Due to the connection between the stop assembly 18 and the limiter assembly 26 the limiting member 92 is slid through the guide 106, which is fixed in a static position. When the clevis pin 100 engages the second end 110 of the guide 106 the limiter assembly 26 is prevented from sliding further towards the first end 30 of the rod 16 and likewise, the boxing assembly 22 is also prevented from sliding further, which prevents further compression of the compression spring 20 and the lowering of the hay rake wheel 82 towards the ground surface 114. The tubular shape of the guide 106 and cylindrical shape of the limiting member 92 received therein prevents bending, excessive movement or vibration, which improves stability of the compression spring assembly 10 and the operation of the hay rake 12.

Therefore, a compression spring assembly 10 has been provided that has increased rigidity, requires fewer parts, is less expense to fabricate and assemble, provides smoother operation, and reduces wear.

From the above discussion and accompanying figures and claims it will be appreciated that the compression spring assembly 10 offers many advantages over the prior art. It will be appreciated further by those skilled in the art that various other modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A compression spring assembly comprising: a rod received through a first stop, a compression spring, and a second stop, wherein the compression spring is positioned between the first stop and the second stop; a limiter assembly having a guide assembly connected to the rod; the limiter assembly having a limiting member; the guide assembly having a guide having a tubular shape; wherein the opening in the guide receives the limiting member; wherein the limiting member is off-set from the rod and extends parallel to the rod.

2. The assembly of claim 1 wherein the limiting member has a cylindrical shape.

3. The assembly of claim 1 further comprising the limiting member having a plurality of openings.

4. The assembly of claim 1 further comprising a stop assembly having the first stop and a boxing assembly having the second stop.

5. The assembly of claim 4 further comprising an arm connection assembly connected to the rod and an arm of a hay rake.

6. The assembly of claim 5 further comprising a wheel connection assembly connected to the boxing assembly and a hay rake wheel of the hay rake.

7. A compression assembly comprising:
a rod that extends from a first end to a second end;
the rod receiving through an opening in a stop assembly, an opening in a compression spring, and an opening in a boxing assembly, wherein the stop assembly is positioned adjacent the first end of the rod, the boxing assembly is positioned adjacent the second end of the rod, and the compression spring is positioned between the stop assembly and the boxing assembly;

the stop assembly extending from a first end to a second end with a first stop positioned at the first end;

the boxing assembly extending from a first end to a second end with a second stop positioned between the first end and the second end of the boxing assembly, wherein the second stop separates a body of the boxing assembly into a first portion that extends from the second stop and the first end of the boxing assembly and a second portion that extends from the second stop and the second end of the boxing assembly; and an adjustment member connected to a first end of the rod and an arm connection assembly connected to a second end of the rod;

a limiter assembly and a wheel connection assembly connected to the boxing assembly;

the limiting assembly having a limiting member with a plurality of openings;

a guide assembly connected to the rod and having a guide that receives and encompasses the limiting member; and a pin received through one of the plurality of openings in the limiting member between an end of the guide and an end of the limiting member.

8. The assembly of claim 7, wherein the limiting member is cylindrical in shape and the guide is tubular in shape.

9. The assembly of claim 7 wherein the first end of the rod is threaded.

10. The assembly of claim 7 wherein the diameter of the first stop and the diameter of the second stop is larger than the diameter of the opening in the compression spring.

11. The assembly of claim 7 further comprising a first bushing received by the rod and within the opening in the stop assembly, and a second bushing received by the rod and within the opening in the boxing assembly.

12. The assembly of claim 7 further comprising the arm connection assembly having a clevis that extends outwardly away from the first end and the second end of the rod.

13. The assembly of claim 7 wherein the opening in the guide extends in parallel-spaced alignment with a length of the rod extending between the first end and the second end of the rod.

14. The assembly of claim 7 wherein the first portion of the boxing assembly has a diameter smaller than the opening in the compression spring such that first portion is configured to be received within the opening in the compression spring during operation.

15. The assembly of claim 14 further comprising a post extending upwardly from the boxing assembly in a direction perpendicular to the direction extending between the first end and the second end of the boxing assembly.

16. The assembly of claim 15 further comprising the limiting member having a connecting member that receives the post of the boxing assembly.

17. The assembly of claim 7 wherein the limiting member extends in parallel-spaced alignment with a length of the rod extending from the first end to the second end of the rod.

18. A compression spring assembly comprising: a rod received through a first stop, a compression spring, and a second stop, wherein the compression spring is positioned between the first stop and the second stop; a limiter assembly having a guide assembly connected to the rod; the limiter assembly having a limiting member, wherein the limiting member is off-set from the rod and extends parallel to the rod; the guide assembly having a guide having a tubular shape, wherein the opening in the guide receives the limiting member.

* * * * *